(12) United States Patent
Castle et al.

(10) Patent No.: US 11,632,256 B2
(45) Date of Patent: Apr. 18, 2023

(54) PHYSICAL UNCLONABLE FUNCTION ENCODER

(71) Applicant: Lexmark International, Inc., Lexington, KY (US)

(72) Inventors: Scott Richard Castle, Lexington, KY (US); Gary Allen Denton, Lexington, KY (US); Robert Henry Muyskens, Lexington, KY (US); Samuel Leo Rhodus, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 17/541,003

(22) Filed: Dec. 2, 2021

(65) Prior Publication Data

US 2022/0094562 A1  Mar. 24, 2022

Related U.S. Application Data

(62) Division of application No. 16/822,347, filed on Mar. 18, 2020, now abandoned.

(60) Provisional application No. 62/822,495, filed on Mar. 22, 2019.

(51) Int. Cl.
*H04L 9/32* (2006.01)
*B41J 2/175* (2006.01)
*G01R 33/20* (2006.01)
*H01F 1/055* (2006.01)
*H04L 9/08* (2006.01)

(52) U.S. Cl.
CPC ........ *H04L 9/3278* (2013.01); *B41J 2/17503* (2013.01); *G01R 33/20* (2013.01); *H01F 1/055* (2013.01); *H04L 9/0861* (2013.01)

(58) Field of Classification Search
None
See application file for complete search history.

(56) References Cited

U.S. PATENT DOCUMENTS 10,921,393 B2 * 2/2021 Corbett .............. G01R 33/0094
10,958,270 B2 * 3/2021 Lu ............................ G11C 7/24

\* cited by examiner

*Primary Examiner* — Crystal L Hammond

(57) ABSTRACT

The use of a magnetic particle based "PUF" (Physically Unclonable Function) disk, when read by magnetic sensor (s), as a positional encoder is described. It is often necessary to include a linear or rotary encoder within a device for tracking motor movements, or to enable a closed-loop control algorithm on the motor system. These randomly dispersed magnetic particle disks can be used as a positional encoder, where the speed of movement and the direction of movement may be monitored.

2 Claims, 5 Drawing Sheets

PHYSICAL UNCLONABLE FUNCTION ENCODER

CROSS REFERENCES TO RELATED APPLICATIONS

This application is a divisional application of U.S. patent application Ser. No. 16/822,347, filed Mar. 18, 2020, entitled "Physical Unclonable Function Encoder" which claims priority to U.S. Provisional Patent Application Ser. No. 62/882,495, filed Mar. 22, 2019, entitled "Physical Unclonable Function Encoder," the contents of which are hereby incorporated by reference in their entirety.

BACKGROUND

The present disclosure relates generally the use of a physical unclonable function object as a positional encoder.

SUMMARY

Described here is the use of a magnetic particle based "PUF" (Physically Unclonable Function) disk, when read by magnetic sensor(s), as a positional encoder. It is often necessary to include a linear or rotary encoder within a device for tracking motor movements, or to enable a closed-loop control algorithm on the motor system. PUF disks are capable of communicating unique data elements. These randomly dispersed magnetic particle disks can be used as a positional encoder, where the speed of movement and the direction of movement may be monitored.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
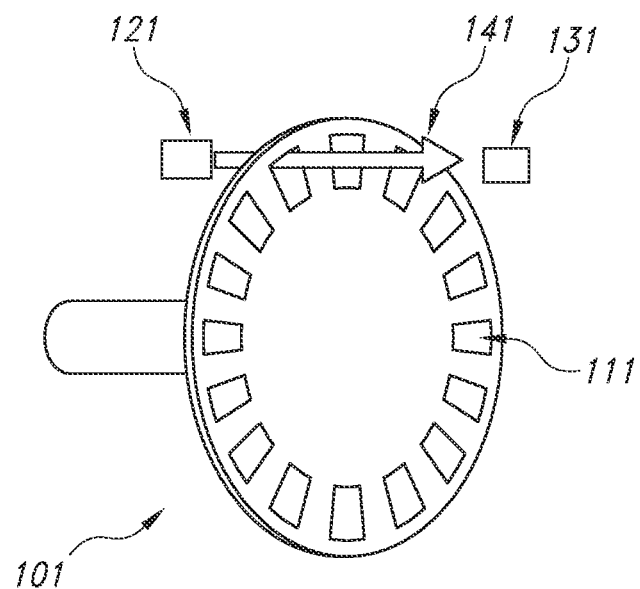
FIG. 1 shows an optical encoder with a light source and photo detector

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise. The use of "including," "comprising," or "having," and variations thereof herein is meant to encompass the items listed thereafter and equivalents thereof as well as additional items.

Terms such as "about" and the like have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top," "bottom," "front," "back," "rear," and "side," "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc., and are also not intended to be limiting. Like terms refer to like elements throughout the description.

The use of magnetic particle based "PUF disks" (a Physically Unclonable Function), when read by magnetic sensor(s), are capable of communicating a unique data element. One use of these PUF disks and sensors is for cartridge security chip authentication as set forth in U.S. Pat. No. 9,553,582, titled "Physical Unclonable Functions Having Magnetic and Non-Magnetic Particles," the content of which is hereby incorporated by reference herein in its entirety. Described here is an alternative use for these PUF disks and sensors generally, and within a printing device. These randomly dispersed magnetic particle disks can be used as a positional encoder.

Figure 2:
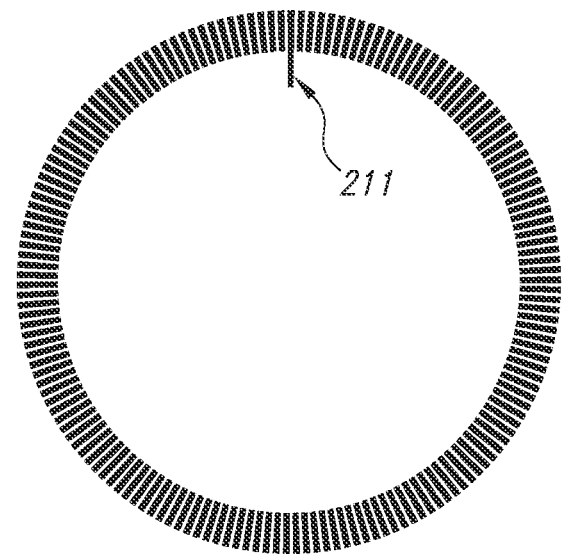
FIG. 2 shows an optical encoder with the home position identified.

It is often necessary to include a linear or rotary encoder within a printing device for tracking motor movements, or to enable a closed-loop control algorithm on the motor system. A common type of rotary encoder used is an optical encoder, such as shown in FIGS. 1 and 2. A physical disk 101 is setup such as with openings 111 to alter a light source's 121 ability to shine 141 on a photo detector 131. Disks can have a variety of resolutions (lines per inch "LPI"), and some may include a home sensor 211 of some sort, so that exact rotational position of the motor system can be determined (during power-on sequences typically).

Figures 3A, 3B:
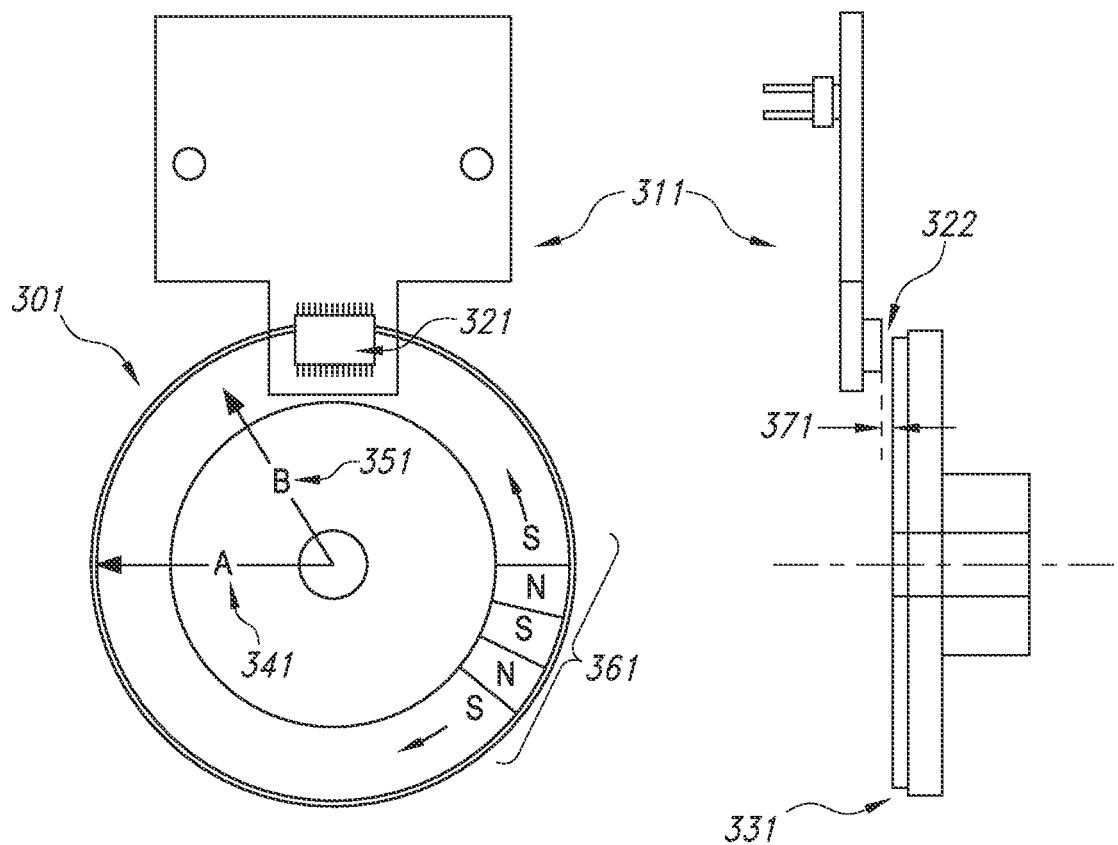
FIG. 3A shows a front view of a magnetic encoder.
FIG. 3B shows a side view of a magnetic encoder.

There are other types of rotary encoders, such as a magnetic encoder 301 shown in FIGS. 3A and 3B. In this device, a magnetic disk 331 is typically built with a pattern of alternating polarity regions 361. As the encoder turns, at the target radius 341 and pitch diameter 351, the magnetic disk moves past the sensors 321, 322 separated by an air gap 371. Again, the resolution of the encoder can be determined by the number of different polarized regions.

Figure 4:
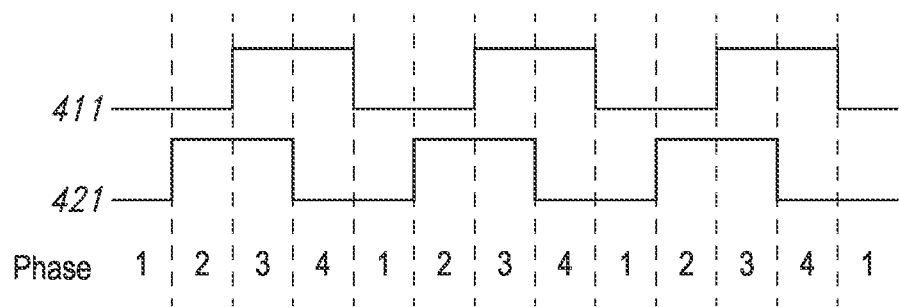
FIG. 4 shows output of a magnetic encoder as shown in FIGS. 3A and 3B, which is typically two offset square waves.

In order to detect the direction of rotation, a quadrature encoder is typically used. A quadrature encoder typically consists of 2 sensors 321, 322 offset in position so that as the encoder disk spins the sensor picks-up changes at different times. The resulting output shown in FIG. 4 is typically two offset square waves 411, 421. Signal 411 would rise while 421 is high when the encoder spins clockwise for example, but when spinning counterclockwise signal 421 would rise while 411 is high. Thus, the core functional capabilities needed for a rotary encoder include: (1) rotational detection (including speed), (2) position detection (homing), and (3) direction of motion distinction.

Figure 5:
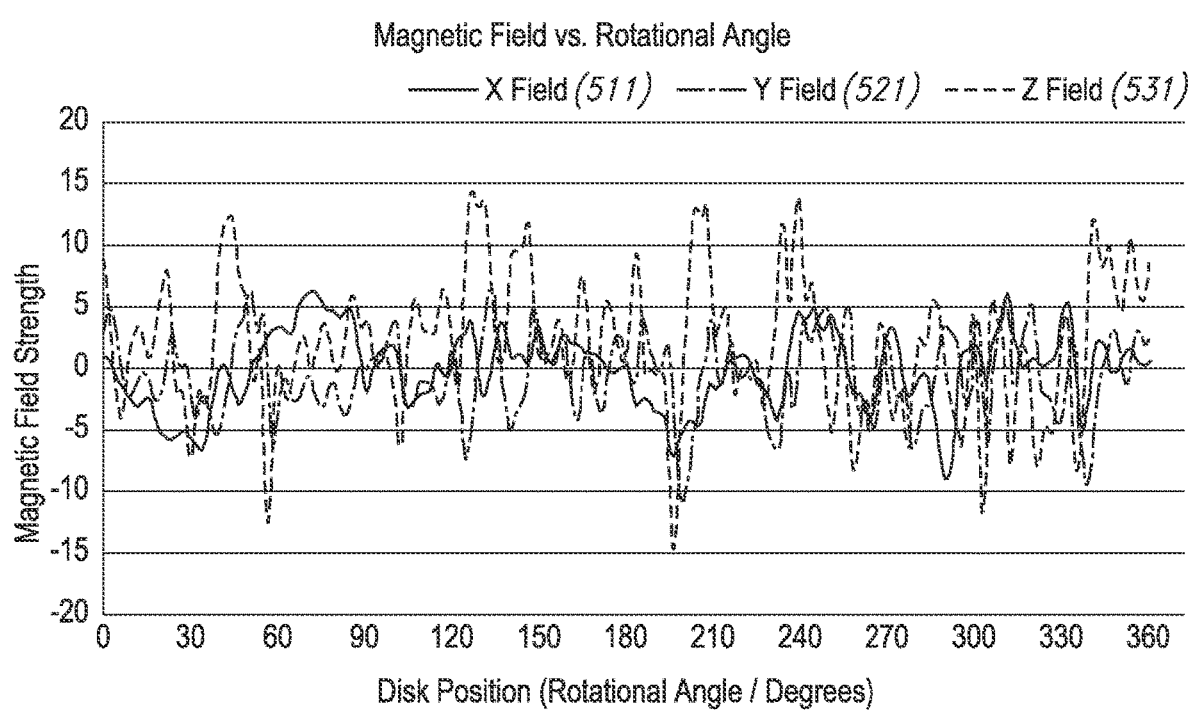
FIG. 5 shows the magnetic field strengths of a PUF disk along a specific path as the disk spins.

The PUF disk contains a mixture of magnetic and non-magnetic particles dispersed within the disk substrate. When this disk spins in the presence of the magnetic sensor(s), a magnetic field vector is determined. The field strengths are often plotted in a chart such as in FIG. 5, showing X Field signal 511, Y Field signal 521, and Z Field signal 531. The type, size, and quantity of magnetic and non-magnetic particles used to create the PUF disk will affect the typical field strength plot's shape (maximum or minimum amplitudes, inflection point frequency, etc.).

Figure 6:
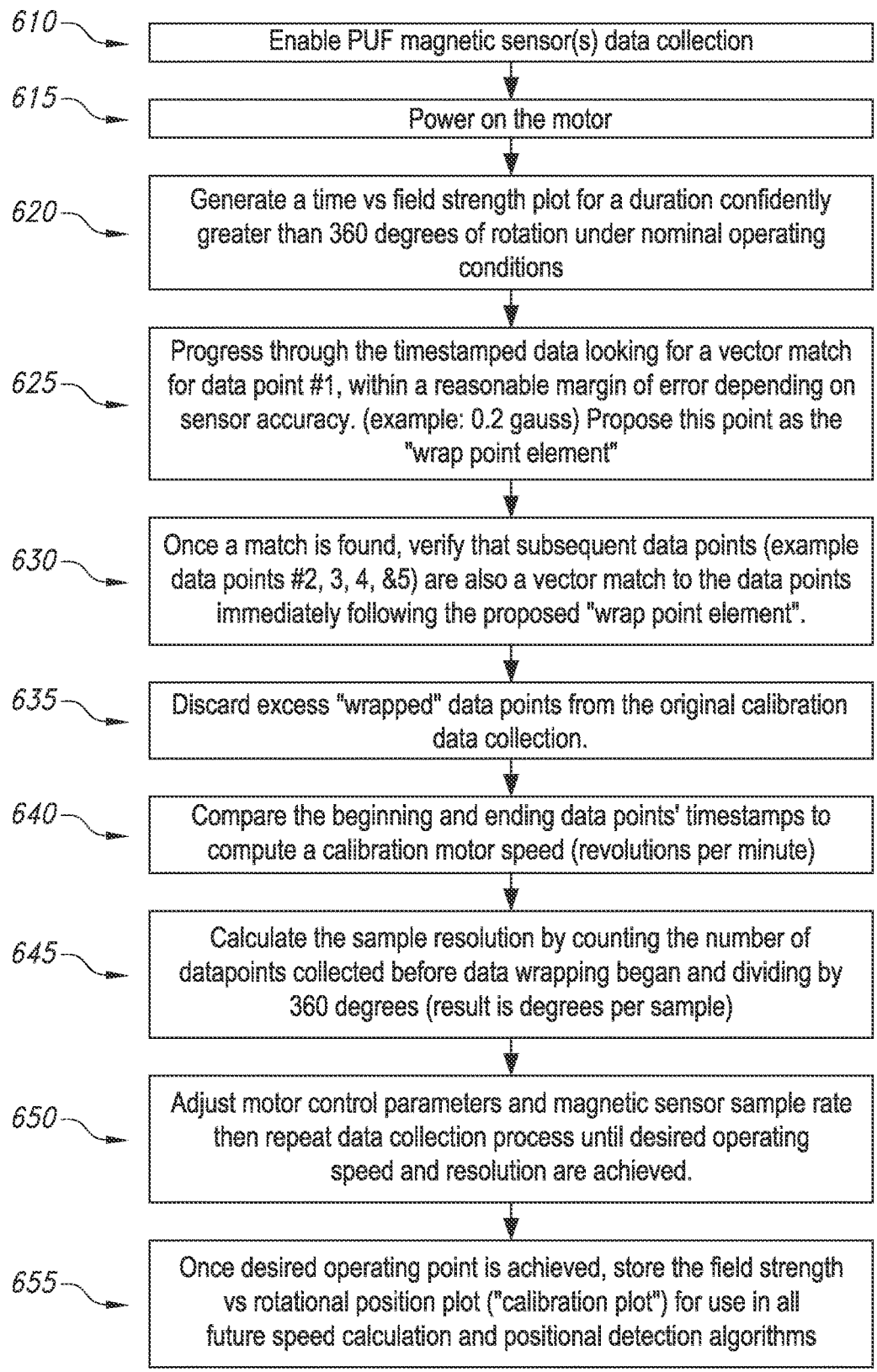
FIG. 6 shows the initialization and calibration of the PUF encoder.

The initialization and calibration of the PUF encoder is shown in FIG. 6. At the time of first use of a PUF encoder, the device performs an initialization sequence to define the expected pattern of the field plot through one complete 360° rotation. First, the PUF magnetic sensor data collection is enabled 610, and the encoder disk motor is powered 615. The time versus field strength plot is generated 620. In practice, the device should actually rotate more than 360° during enrollment in order to confidently build a precise "wrap point" in the data. While calibrating, field strength amplitude readings are interpolated so that a fixed time scale plot can be generated, and from that, a precise wrap point is selected—even in the event that a sensor is not reporting at a precise timing interval. Next at 625, the timestamped data is processed to identify a vector match for a first point, within a reasonable margin of error for sensor accuracy. This point is proposed as the wrap point element.

Once a match for the first point is found, subsequent data points (for example, data points 2, 3, 4, and 5) are also a vector match to the data points 630 immediately following the proposed "wrap point element." Excess "wrapped" data points from the original calibration data collection are discarded at 635. The beginning and ending data point timestamps are compared 640 to compute a calibration motor speed (revolutions per minute). The sample resolution is calculated 645 by counting the number of datapoints collected before data wrapping began and dividing by 360° (the result is degrees per sample).

The motor control parameters and magnetic sensor sample rate are adjusted 650, then the data collection process is repeated until the desired operating speed and resolution are achieved. Once the desired operating point is achieved, the field strength versus rotational position plot ("calibration plot") is stored 655 for use in all future speed calculation and positional detection algorithms.

There are a variety of ways by which the stored PUF field "calibration plot" can be compared to the continuous input stream of sensor data to determine rotational speed. One proposed method would be to locate all inflection points within each of the x, y, and z field strengths and use these as key points. For example, the plot in FIG. 5 has approximately 300 clear inflection points (roughly 100 per direction). With this information, it is possible to compute an average motor speed (degrees/second) by counting the inflections per second read by the sensor in real time and multiplying by 360/300 (degrees per inflection). Using a parameter such as inflection point could be beneficial in minimizing potential issues from variation of sensor read distance from the encoder disk (which affects field measurements). Another approach would be simply to rely on local maxima and minima of the data. Also, the type and size of magnetic particles used could be adjusted to increase or decrease the typical number of inflections per degree of rotation, and thus result in different speed measurement precision. Magnetic materials such as an alloy of neodymium, iron, and boron ("NdFeB") has the desired properties, but other materials such as, but not limited to, an alloy of samarium and cobalt ("SmCo") might also be used.

One skilled in the art would know that there are many ways that could be used to compute motor speed by comparing a parameter seen in the "calibration plot" with the measured field strength sensor data seen as the motor spins. Some methods will have higher accuracy, at the expense of more complex computational requirements. Based on the application need, and processing power available, any number of methods could be optimally selected.

Figure 7:
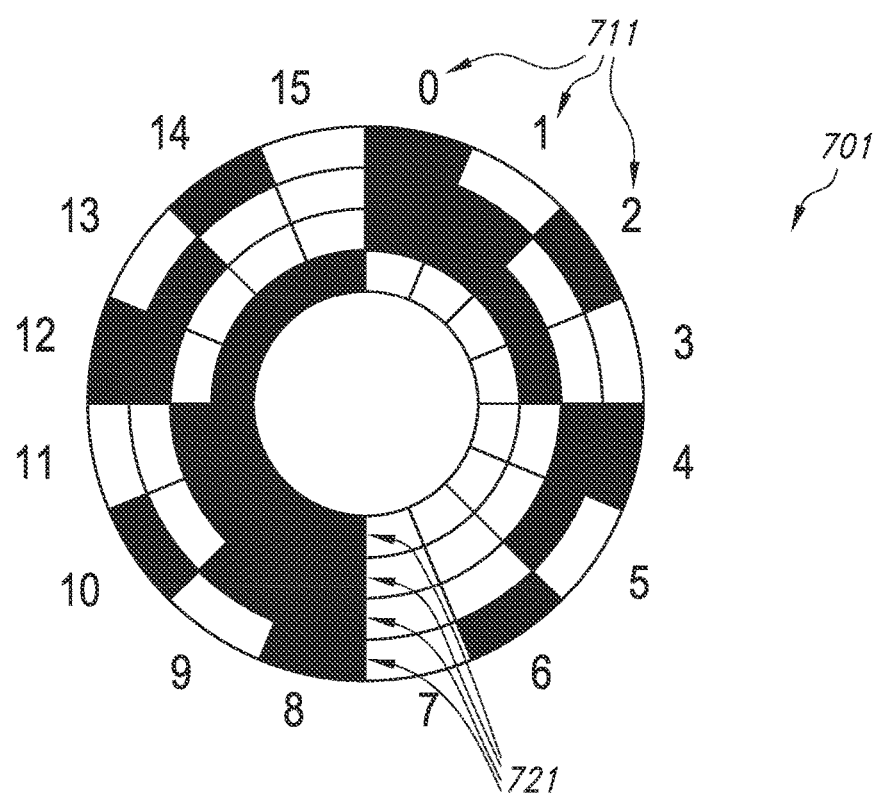
FIG. 7 shows a traditional encoder wheel with sixteen zones, where each zone is divided into four areas according to the radial position.

Some traditional encoders 701 such as shown in FIG. 7 provide an ability to detect the absolute position of the encoder wheel within some, often coarse, resolution.

Sixteen zones 711 are shown in FIG. 7, with varying divisions of the zones 721 according to the radius. The PUF encoder described here provides the ability to read the magnetic field strength (vector) and make a positional prediction by comparing the reading against the known "calibration plot" field strengths which were stored at each rotational position. This has the potential to be quite precise in reporting the angular position, because the calibration plot could be recorded at high angular resolution. For example the field could be recorded at every 0.2 degree angular rotation (1800 samples across the 360 degrees of rotation).

Based on analysis of a sample PUF scan (with 0.2 degree increment sampling), less than 2% of the sample points have a closely matching field vector seen elsewhere in the plot. In this case "closely matching" is defined to be a point where all 3 directional field strength readings were within 0.2 gauss of another data point. Decreasing that tolerance to 0.1 gauss results in less than 0.3% duplicates, and a 0.05 gauss tolerance resulted in 0.005% of data points having a duplicate. There are a variety of ways this dual-positioning occurrence could be mitigated.

One option would be to scan the PUF disk at time of manufacturing and discard any disk with too many duplicates. A second option would be to scan the PUF disk with the sensor at multiple radial positions until a radius is found with minimal or no duplicates at a target gauss tolerance. Third, the duplicate occurrences could be managed within the motor control code. In the event that a potential duplicate was found, the motor could be moved less than 1 degree to determine and/or confirm which of the potential absolute angular positions is correct. Fourth, one of the multiple potential absolute positions could be arbitrarily chosen. The motor operation could be initiated and operated as intended, but as the motor spins, an auto correction of the position at the next stop could be employed. Finally, an optical encoder could be used to collect a second data sample in an effort to distinguish which of the potential matched field vectors is correct. PUF disks with an alloy of neodymium, iron, and boron (NdFeB), with the magnetic particles that are used, have a reflective appearance which could be used in conjunction with a reflective optical sensor.

Figure 8:
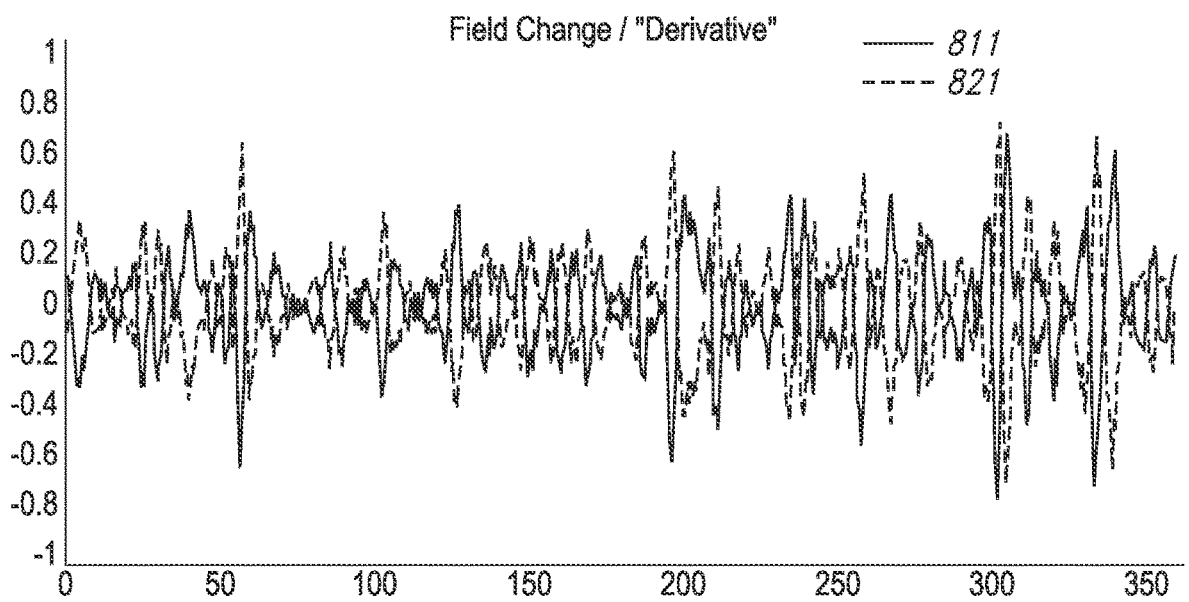
FIG. 8 shows a vector derivative representation to determine directional change of an encoder.

By comparing the incoming sensor signal with the "calibration plot" it will be clear whether the sensor data is tracking in a clockwise or counterclockwise direction based, thus determining motor spin direction. There are other methods for detecting directional change without evaluating and mapping multiple data points. For example, a change in direction may also be determined by continually computing the field change "derivative" and looking for instantaneous sign changes (not at zero). FIG. 8 offers an example of a vector derivative representation. The sign is intuitively inversed based on direction of travel (Clockwise 811, Counterclockwise 821).

An example use of a PUF encoder is to manage toner flow in a printer. The electrophotographic printing process is well known in the art. The transfer of toner from a cartridge to a developer unit is described, for example, in U.S. Pat. No. 10,451,998, titled "Toner Level Detection Measuring an Orientation of a Rotatable Magnet Having a Varying Radius," the content of which is hereby incorporated by reference herein in its entirety. A toner cartridge is removably mounted in an imaging forming device in a mating relationship with developer unit. Toner is periodically transferred from a toner cartridge to resupply the toner sump in the developer unit.

Careful movement of toner out of the cartridge and into the printing system can be critical to machine reliability and life. If too much toner is transferred out of the cartridge and into the sump it can create excessive waste or even spillage onto surrounding components. Too little toner can be equally bad, resulting in filming on EP components, and ultimately poor print quality and degraded machine life.

When a toner cartridge is built the PUF disk could be placed onto a gear which is in mechanical linkage to the mechanical toner control system. In this configuration, the printer could use the PUF rotary encoder, without the expense of adding an additional optical encoder or flag. In the event that the PUF rotary encoder ceases to return the expected signal response, the motor controlling the toner auger should cease to pull toner out of the cartridge in an attempt to prevent machine damage or print quality degradation. Replacing the toner cartridge and its PUF encoder wheel restores the printer to proper operation and allows the printer to reliably control the motor(s) moving toner through the system.

Many printing systems attempt to stop the paddles within the cartridge in specific positions to prevent toner compaction and minimize the potential of the paddles breaking when excess torque is applied. It is also important not to park the paddles in a position which can cause permanent deformation. The PUF encoder disk may be used to prevent this occurrence by monitoring the stopping position, or only starting the paddle motion if the absolute encoder position is within an acceptable position—as determined by the PUF encoder system.

Finally, the PUF encoder may be used to control the amount of toner that is fed out of the cartridge based on the print/process speed.

The foregoing description of embodiments has been presented for purposes of illustration. It is not intended to be exhaustive or to limit the present disclosure to the precise steps and/or forms disclosed, and obviously many modifications and variations are possible in light of the above teaching. It is intended that the scope of the invention be defined by the claims appended hereto.

We claim:

1. A method of initializing and calibrating a PUF encoder to define the expected pattern of the field plot through one complete rotation comprising:
    enabling a physical unclonable function magnetic sensor data collection;
    powering an encoder disk motor;
    generating a time versus field strength plot by rotating the encoder disk more than 360° during enrollment in order to build a wrap point in the data;
    while calibrating, interpolating field strength amplitude readings so that a fixed time scale plot can be generated, from which the wrap point is selected;
    processing the timestamped data to identify a vector match for a first point, within a reasonable margin of error for sensor accuracy;
    proposing a point as the wrap point element;
    finding a match for the first point, finding subsequent data points that are a vector match to the data points immediately following the wrap point element;
    comparing the beginning and ending data point timestamps to compute a calibration motor speed in revolutions per minute;
    calculating a sample resolution by counting the number of data points collected before data wrapping began and dividing by 360;
    adjusting the motor control parameters and magnetic sensor sample rate, if necessary;
    repeating the data collection process until the desired operating speed and resolution are achieved.

2. The method of claim 1, wherein the field strength versus rotational position plot, a calibration plot, is stored for use in all future speed calculation and positional detection algorithms.

* * * * *